(12) United States Patent
Huang et al.

(10) Patent No.: US 12,387,033 B2
(45) Date of Patent: Aug. 12, 2025

(54) INFORMATION INSERTION METHOD AND APPARATUS, DEVICE, MEDIUM, AND COMPUTER PROGRAM PRODUCT

(71) Applicant: Tencent Technology (Shenzhen) Company Limited, Shenzhen (CN)

(72) Inventors: Tieming Huang, Shenzhen (CN); Yang Zhou, Shenzhen (CN); Rui Tang, Shenzhen (CN); Li Lin, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 186 days.

(21) Appl. No.: 18/217,320

(22) Filed: Jun. 30, 2023

(65) Prior Publication Data

US 2023/0342539 A1  Oct. 26, 2023

Related U.S. Application Data

(63) Continuation of application No. PCT/CN2022/127131, filed on Oct. 24, 2022.

(30) Foreign Application Priority Data

Jan. 11, 2022  (CN) .......................... 202210028994.2

(51) Int. Cl.
*G06F 3/04842* (2022.01)
*G06F 40/166* (2020.01)
*G06F 40/205* (2020.01)

(52) U.S. Cl.
CPC .......... *G06F 40/166* (2020.01); *G06F 40/205* (2020.01)

(58) Field of Classification Search
CPC .......................... G06F 3/048–05; G06F 40/166
See application file for complete search history.

(56) References Cited

U.S. PATENT DOCUMENTS 7,836,412 B1 * 11/2010 Zimmerman ......... G06F 40/103
704/235
9,477,374 B1 * 10/2016 Snabl ...................... H04L 67/10
(Continued)

FOREIGN PATENT DOCUMENTS

CN    101296198 A    10/2008
CN    102780647 A    11/2012
(Continued)

OTHER PUBLICATIONS

Tencent Technology, WO, PCT/CN2022/127131, Jan. 19, 2023, 3 pgs.
Tencent Technology (Shenzhen) Company Limited, ISR, PCT/CN2022/127131, Jan. 19, 2023, 2 pgs.

*Primary Examiner* — Daniel Rodriguez
(74) *Attorney, Agent, or Firm* — Morgan, Lewis & Bockius LLP

(57) ABSTRACT

An information insertion method performed by a computer device relates to the field of information processing. The method includes: displaying an editing interface corresponding to an online document; receiving a contact insertion operation in the editing interface; in response to the contact insertion operation, inserting a contact corresponding to a first account into the online document; and displaying the contact corresponding to the first account in the online document, the contact corresponding to the first account providing a communication portal for instant messaging with the first account through the online document.

17 Claims, 13 Drawing Sheets

(56) References Cited

U.S. PATENT DOCUMENTS

| | | | | |
|---|---|---|---|---|
| 9,715,482 | B1* | 7/2017 | Bjorkegren | G06F 3/04855 |
| 11,507,730 | B1* | 11/2022 | Farquhar | G06F 3/0482 |
| 2002/0198909 | A1* | 12/2002 | Huynh | G06F 40/30 |
| | | | | 715/201 |
| 2006/0282784 | A1* | 12/2006 | Taylor | G06Q 10/10 |
| | | | | 715/205 |
| 2007/0143408 | A1* | 6/2007 | Daigle | H04L 51/04 |
| | | | | 709/206 |
| 2017/0068445 | A1* | 3/2017 | Lee | G06F 40/171 |
| 2017/0069297 | A1* | 3/2017 | Lu | G09G 5/00 |
| 2017/0102852 | A1* | 4/2017 | Agrawal | G06F 3/04817 |
| 2017/0102871 | A1* | 4/2017 | Won | G06F 9/451 |
| 2017/0364481 | A1* | 12/2017 | Scapa | H04L 51/48 |
| 2018/0329621 | A1* | 11/2018 | Sonnino | G06F 3/04842 |
| 2019/0102057 | A1* | 4/2019 | Liao | H04L 67/565 |
| 2019/0361580 | A1* | 11/2019 | Dowling | G06F 3/0484 |
| 2020/0351314 | A1* | 11/2020 | Butcher | H04L 65/4025 |
| 2020/0356221 | A1* | 11/2020 | Behzadi | H04L 67/10 |
| 2021/0256476 | A1* | 8/2021 | Mpare | H04W 4/029 |
| 2021/0334456 | A1* | 10/2021 | Zeng | G06F 40/166 |
| 2021/0350276 | A1* | 11/2021 | Ashlock | G06N 5/025 |
| 2022/0075932 | A1* | 3/2022 | Lin | G06F 40/134 |
| 2022/0078143 | A1* | 3/2022 | Eirinberg | H04L 51/216 |
| 2022/0141306 | A1* | 5/2022 | Brown | H04L 67/535 |
| | | | | 709/204 |
| 2023/0099324 | A1* | 3/2023 | Wahl | H04L 51/48 |
| | | | | 715/751 |

FOREIGN PATENT DOCUMENTS

| | | | |
|---|---|---|---|
| CN | 104753759 A | 7/2015 | |
| CN | 110162758 A | 8/2019 | |
| CN | 110390531 A | 10/2019 | |

\* cited by examiner

INFORMATION INSERTION METHOD AND APPARATUS, DEVICE, MEDIUM, AND COMPUTER PROGRAM PRODUCT

CROSS-REFERENCE TO RELATED APPLICATIONS

This application is a continuation application of PCT Patent Application No. PCT/CN2022/127131, entitled "INFORMATION INSERTION METHOD AND APPARATUS, DEVICE, MEDIUM, AND COMPUTER PROGRAM PRODUCT" filed on Oct. 24, 2022, which claims priority to Chinese Patent Application No. 202210028994.2, entitled "INFORMATION INSERTION METHOD AND APPARATUS, DEVICE, MEDIUM, AND COMPUTER PROGRAM PRODUCT" filed on Jan. 11, 2022, all of which is incorporated by reference in its entirety.

FIELD OF THE TECHNOLOGY

This application relates to the field of information processing, in particular, to an information insertion method and apparatus, a device, a medium, and a computer program product.

BACKGROUND OF THE DISCLOSURE

A document is a tool for recording electronic data, and the recorded data content may be read by humans or machines. With the development of document related technologies, in order to improve the convenience of the document, an online document based on the Internet is introduced. It is more convenient for a plurality of users to access, manage, and share the online document.

In a related technology, the online document provides functions such as inserting pictures, inserting tables, inserting formulas, and inserting hyperlinks. If contact of a user or a group needs to be provided in the document, generally, a user account or a group account is edited in document content, and a document sharing user who opens the document adds the user or the group provided in the document content by copying.

However, in a user or group dissemination manner implemented in the above manner, the operation when the document sharing user adds the user or the group provided in the document content is complex, and the corresponding information dissemination efficiency is low.

SUMMARY

Embodiments of this application provide an information insertion method and apparatus, a device, a medium, and a computer program product, which can improve the efficiency of disseminating account information in a document. The technical solutions are as follows:

In one aspect, an information insertion method performed by a computer device is provided, the method including:

displaying an editing interface corresponding to an online document;

receiving a contact insertion operation in the editing interface;

in response to the contact insertion operation, inserting a contact corresponding to a first account into the online document; and displaying the contact corresponding to the first account in the online document, the contact corresponding to the first account providing a communication portal for instant messaging with the first account through the online document.

In another aspect, a computer device is provided. The computer device includes a processor and a memory. The memory stores at least one instruction, at least one program, a code set or an instruction set. The at least one instruction, the at least one program, the code set, or the instruction set are loaded and executed by the processor and causes the computer device to implement any information insertion method in the embodiment of this application.

In another aspect, a non-transitory computer-readable storage medium is provided. The computer-readable storage medium stores at least one program code. The program code is loaded and executed by a processor of a computer device and causes the computer device to implement any information insertion method in the embodiment of this application.

The technical solutions provided by this application at least include the following beneficial effects:

in a document editing process, the contact corresponding to the first account is inserted, through a contact insertion operation, into an online document currently being edited, so that the contact corresponding to the first account is displayed in document content of the online document, and the contact corresponding to the first account is used for providing a communication portal for instant messaging with the first account, which not only improves the efficiency of disseminating the account information in the document, but also provides a new communication manner.

DESCRIPTION OF EMBODIMENTS

Figure 1:
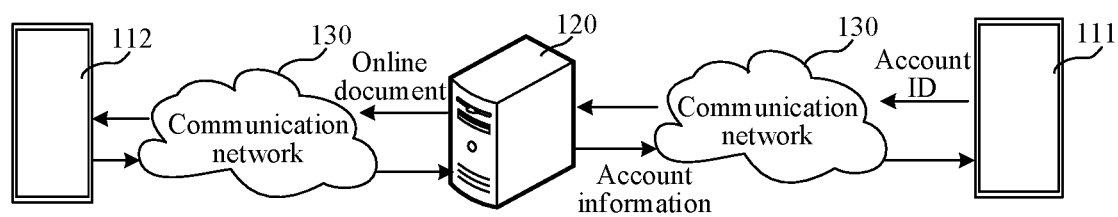
FIG. 1 is a schematic diagram of an implementation environment provided by one exemplary embodiment of this application.

Firstly, refer to FIG. 1, which is a schematic diagram of an implementation environment of an embodiment of this application. Schematically, a computer system of the implementation environment includes a first terminal 111, a second terminal 112, a server 120, and a communication network 130.

A first application that can provide a document editing function, and a second application that can provide a social session function run in the first terminal 111 and the second terminal 112. In some embodiments, the first application and the second application may be two applications independent of each other, may also be different functional modules in the same application, or the second application may be a host program, and the first application is an applet in the second application.

In some embodiments, the first terminal 111 and the second terminal 112 may be a desktop computer, laptop portable computers, mobile phones, tablet computers, e-book readers, moving picture experts group audio layer III (MP3) players, moving picture experts group audio layer IV (MP4) players, and the like. Schematically, the first terminal 111 is an editing terminal for an online document, and the second terminal 112 is a browsing terminal for the online document. In some embodiments, the first terminal 111 and the second terminal 112 may be the same terminal device, or may be different terminal devices.

The server 120 is used for providing back-end support for the first application and the second application above. Schematically, taking the second application being a social application and the first application being a document functional module in the second application as an example, a user runs the first application in the second application through the first terminal 111 and creates an online document. The first terminal 111 receives a contact insertion operation, determines an account identifier (ID) corresponding to the first account according to the contact insertion operation, and transmits the account ID to the server 120. The server 120 returns account information corresponding to the first account according to the account ID. The first terminal 111 assembles contact elements corresponding to the account information to obtain a contact corresponding to the first account, and displays the contact corresponding to the first account in the online document. When the online document is saved, the first terminal 111 may upload the online document to the server 120 to serve as the online document for other terminals to browse and/or edit in a case of authorization. When the second terminal 112 is a terminal that opens the online document, the online document displays the contact corresponding to the first account. The second terminal 112 may establish a session service with the terminal corresponding to the first account through the contact corresponding to the first account displayed in the online document.

The above server 120 may be an independent physical server, or may also be a server cluster or a distributed system composed of a plurality of physical servers, and may also be a cloud server providing basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

The cloud technology refers to a collocation technology that collocates series of resources such as hardware, software, and networks in a wide area network or a local area network to realize computing, storage, processing, and sharing of data. In some embodiments, the above server 120 may also be implemented as a node in a blockchain system.

Schematically, the first terminal 111 is connected to the server 120, and the second terminal 112 is connected to the server 120 through a communication network 130.

Secondly, an application scenario of the embodiment of this application is schematically described.

Schematically, the first application provides a document function, and the second application provides a social function, which are described by taking the second application being a primary application and taking the first application being a secondary application in the second application as an example.

When a user logs in to the second application through a user account, the session service can be established with a friend account with a friend relationship through the social function provided by the second application. Meanwhile, the user can also enable the first application in the second application to edit an online document. The session service is used for providing a session function between accounts with the friend relationship. The editing interface provided by the first application provides a contact insertion control. The user completes the insertion of a to-be-inserted contact corresponding to the first account through the contact insertion control. When the contact insertion control receives a triggering operation, the second application pulls a candidate account list provided by a social functional module in the second application through a functional module interface between the document function and the social function. The candidate account list may include at least one of the accounts such as a user account that logs in the second application currently, the friend account of the above user account, a group account, or an official account. When the user selects at least one first account from the candidate account list, a terminal generates a contact corresponding to the first account according to the selected at least one first account, and the contact corresponding to the first account is inserted into a designated position in the online document. The user may save the online document as an online document, and then a document link corresponding to the online document is shared with other user accounts through the second application. When the other user accounts receive the above document link through the second application, the online document can be browsed and/or edited through the document link, and meanwhile, a session service can also be established with the first account through the contact corresponding to the first account in the online document.

In some embodiments, the above is only described by taking an example in which the first application serves as a secondary application of the second application. The first application and the second application may also be two independent applications, that is, the first application and the second application complete the interaction between the applications through an application programming interface (API) between the applications.

Figure 2:
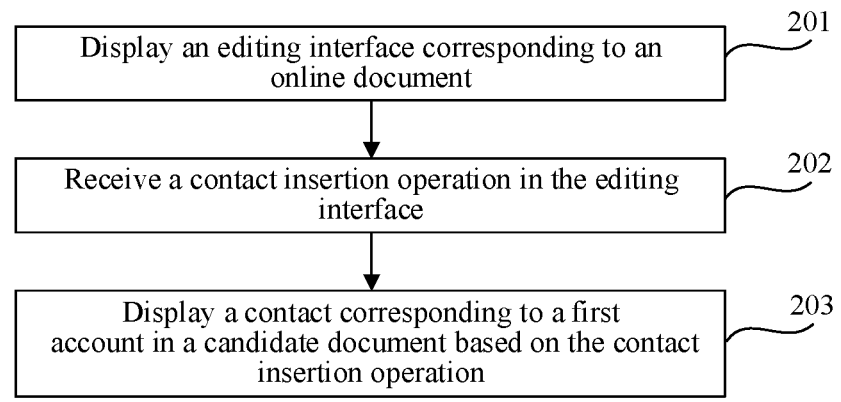
FIG. 2 is a flowchart of an information insertion method provided by one exemplary embodiment of this application.

Refer to FIG. 2, which shows an information insertion method shown by one exemplary embodiment of this application. In the embodiment of this application, the method is applied to the first terminal as shown in FIG. 1, and the method may also be applied to the second terminal or other terminals. Herein, only the first terminal is taken as an example. The method includes:

Step 201: Display an editing interface corresponding to an online document.

The editing interface is configured to edit document content of the online document.

Schematically, the above editing interface is provided by the first application, and the first application is a document application. In some embodiments, the above document application may be an independent application, or may be an applet in a host program, or may also be a plug-in. In some embodiments, the above first application may be a local document application, that is, the online document in the first application is stored in a storage region of a local terminal after being edited. If the online document needs to be shared with terminals of other users, the document needs to be transmitted through the Internet; and even if the transmitted online document is modified by the other users, the content of the online document stored locally will not change. The above first application may also be an online document application, that is, the online document in the first application is automatically stored in a cloud after being edited. A user may share the online document with other users by sharing a document link. Terminals of the other users open the online document through the document link, and permissions of the online document may be browsed and/or edited according to a current user account. If the online document is edited and saved by the other terminals, then the online document stored in the cloud will be updated.

In the embodiment of this application, an application scenario in which the first application is used as an applet in the second application is taken as an example for description, that is, the first application is an applet for providing a document function in the second application, the second application is a primary application of the first application, the first application is a secondary application of the second application, and the second application may be various forms of applications such as a social application, a shopping application, and a video application.

Taking the second application being an enterprise-based social application as an example, the second application, in addition to providing communication for a user account with friend accounts, can also provide communication for the user account with other enterprise employee accounts in the same enterprise to which the user account belongs. Meanwhile, the second application provides a function service of an online document through the first application, that is, a user may create the online document through the first application in the second application. After the online document is edited and saved, the user may select to take the online document as the online document to share with other accounts, or may also select to take the online document as a local document to save.

In some embodiments, a first user account logs in the first application, and a second user account logs in the second application. When the first application is the secondary application of the second application, the first user account and the second user account are the same user account. When the first application and the second application are two independent applications, the first user account and the second user account are two independent user accounts.

In some embodiments, the second application provides an extended function interface. The extended function interface provides a function enabling control corresponding to the first application. When the function enabling control is triggered, the second application enables a functional module corresponding to the first application, the terminal displays the above editing interface, and the editing interface is used for editing the online document. In some embodiments, when the terminal displays the editing interface, the editing interface may be displayed in an application interface corresponding to the second application in an overlapping manner, and the above editing interface may also be displayed in a preset region in the application interface of the second application.

In some embodiments, when the above online document is an online document, a user may also set viewing/editing permissions corresponding to the online document. For example, the user may associate the online document with a session group in the second application to indicate group members in the session group to view the online document. The user may also set the editing permission corresponding to the online document to be limited to administrators of the session group, and then the group members in the session group may open the online document through the second application.

In some embodiments, the above online document may be documents in forms of a text document, a table document, a presentation document, and the like. A file format of the above online document may be file formats such as a .doc format, a .docx format, a .xls format, a .ppt format, and the like.

In some embodiments, the editing interface includes a document content display region and a tool bar region. The document content display region is configured to input document content. The tool bar region is configured to select a tool for assisting in editing, for example, a font editing tool, a paragraph editing tool, an insertion tool, and a layout tool. In the embodiment of this application, the tool bar region includes a contact insertion control that can provide a contact insertion function.

Step 202: Receive a contact insertion operation in the editing interface.

The above contact insertion operation is used for inserting a contact corresponding to the first account into the online document.

The above first account may be an account in the second application. In some embodiments, the above second application may be various types of applications such as a social application, a video application, an article application, which is not limited herein. In some embodiments, the account type of the above first account includes at least one of a user account type, a group account type, or a public account type. The account of the user account type is an application account used by an individual user. The account of the group account type is an application account that is established by the user account and that can accommodate a plurality of user accounts for making a session. The account of the public account type is an official application account applied by a developer or a merchant on an application platform, such as an official account, a subscription account, and a service account.

The above first account may be a second user account that the current terminal logs in the second application, or may also be an account with a preset contact relationship with the second user account in the second application. For example, a friend account corresponding to the second user account, or other enterprise employee accounts in the same enterprise to which the second user account belongs, or a group account, a public account, and the like provided in the second application.

In some embodiments, when the first application is the secondary application of the second application, that is, when the first user account and the second user account are the same user account, the editing interface corresponding to the first application may further provide a social linkage control. The social linkage control can provide invitations for other users to edit the online document together. When the social linkage control receives a triggering operation, an invitation account list is displayed, and the account in the above invitation account list is the friend account corresponding to the second user account in the second application.

In some embodiments, the above contact insertion operation may be an operation implemented through a control, or may be an operation implemented through a shortcut key, or may be an operation implemented through a touch gesture, which is not limited herein.

Step 203: Display the contact corresponding to the first account in the online document based on the contact insertion operation.

The contact corresponding to the first account is used for providing a communication portal for instant messaging with the first account.

In some embodiments, the contact corresponding to the first account is implemented as a static contact, that is, the contact of the first account is used for displaying account information of the first account. Or, the contact corresponding to the first account has an instant messaging enabling function, that is, when there is an account that performs contact triggering operation on the contact corresponding to the first account, the account may perform instant messaging with the first account through the contact corresponding to the first account.

The instant messaging includes at least one of the communication types, such as a session service, a video communication server, and a voice session service.

The contact corresponding to the above the first account includes a contact element for previewing account information of the first account.

Figure 3:
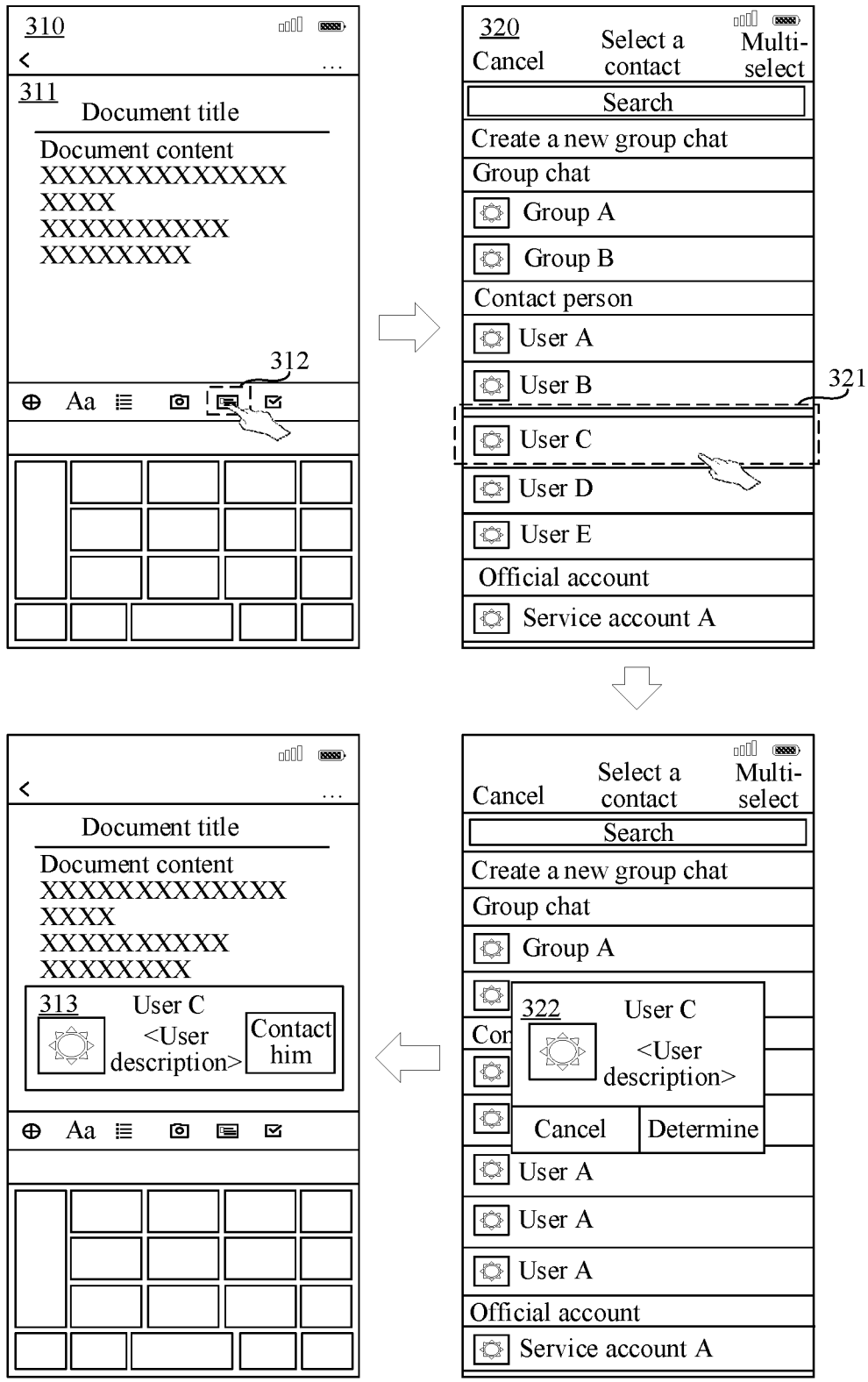
FIG. 3 is a schematic diagram of an execution flowchart of a contact insertion operation provided by one exemplary embodiment of this application.

In some embodiments, the above contact insertion operation is implemented through a contact insertion control. Schematically, a first control triggering operation for the contact insertion control is received, and a candidate account list is displayed based on the first control triggering operation. The candidate account list includes a first account, and it is determined that the contact insertion operation is received in response to a selection operation for the first account in the candidate account list. In one example, FIG. 3 shows a schematic diagram of an execution flowchart of a contact insertion operation provided by one exemplary embodiment of this application. The editing interface 310 displays an online document 311. The editing interface 310 further displays a contact insertion control 312. A candidate account list 320 is displayed after a user clicks the contact insertion control 312. When an option corresponding to the first account 321 in the candidate account list 320 receives a clicking operation, an insertion confirmation box 322 pops up. When the insertion confirmation box 322 receives a confirmation signal, a contact 313 corresponding to the first account 321 is input at a first display position in the online document 311 for displaying. That is, the candidate account list including the first account is displayed through a first control triggering operation for the contact insertion control, so that a selection operation may be performed on the first account in the candidate account list, as a contact insertion operation, the insertion of the contact corresponding to the first account into the online document is simplified, and the human-computer interaction efficiency is improved.

Figure 4:
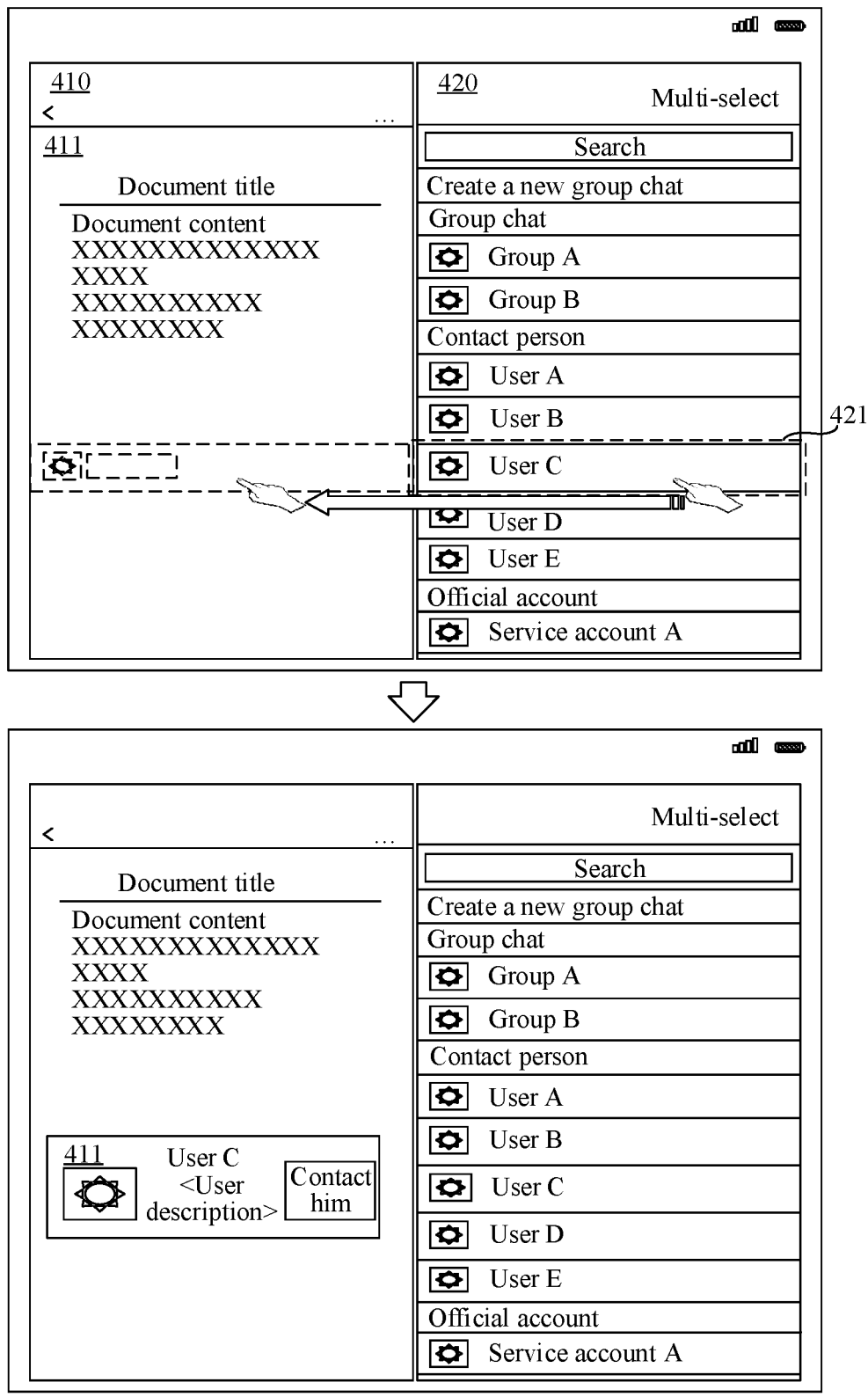
FIG. 4 is a schematic diagram of an execution flowchart of a contact insertion operation provided by another exemplary embodiment of this application.

In some embodiments, the above contact insertion operation is implemented through a gesture operation. Schematically, when the terminal can simultaneously display the editing interface and an account list interface in the second application, and the contact corresponding to the first account may be inserted into the online document through the gesture operation. In some embodiments, the above gesture operation includes at least one of a click operation, a double-click operation, a long press operation, or a sliding operation. In one example, taking the gesture operation being the sliding operation as an example, FIG. 4 shows a schematic diagram of an execution flowchart of a contact insertion operation provided by one exemplary embodiment of this application. The terminal displays an editing interface 410 corresponding to the first application and an account list interface 420 corresponding to the second application. After a user drags the first account 421 displayed in the account list interface 420 to a second display position in the editing interface 410 through the sliding operation, a contact 411 corresponding to the first account 421 is displayed at the display position displayed in the editing interface 410.

In some embodiments, when the account type of the contact corresponding to the first account is the user account type, the account information displayed in the contact corresponding to the first account may include at least one type of account information such as a user nickname, a user avatar, user description information, and a user account ID, and user voice information. The user description information may be user defined signature information. When the second application is an enterprise-based social application, the above user description information may also be position information of the user corresponding to the first account in an enterprise, and the above user voice information is the voice information defined and disclosed by the user account.

When the account type of the contact corresponding to the first account is the group account type, the account information displayed in the contact corresponding to the first account may include account information such as a group name, a group avatar, group member information, group description information, and a group account ID. The above group member information may be user information of all members in a group, or may be user information of part members in the group, such as user information of a creator and/or an administrator of the group. The group avatar may be an avatar generated by user avatars of all or part members in the group, or may also be a user-defined image. The group account corresponding to the contact corresponding to the first account is also an account provided in the second application. Taking the first application being the primary application of the second application as an example, the above group account is a group to which the second user account that the second application logs in belongs.

Figure 5:
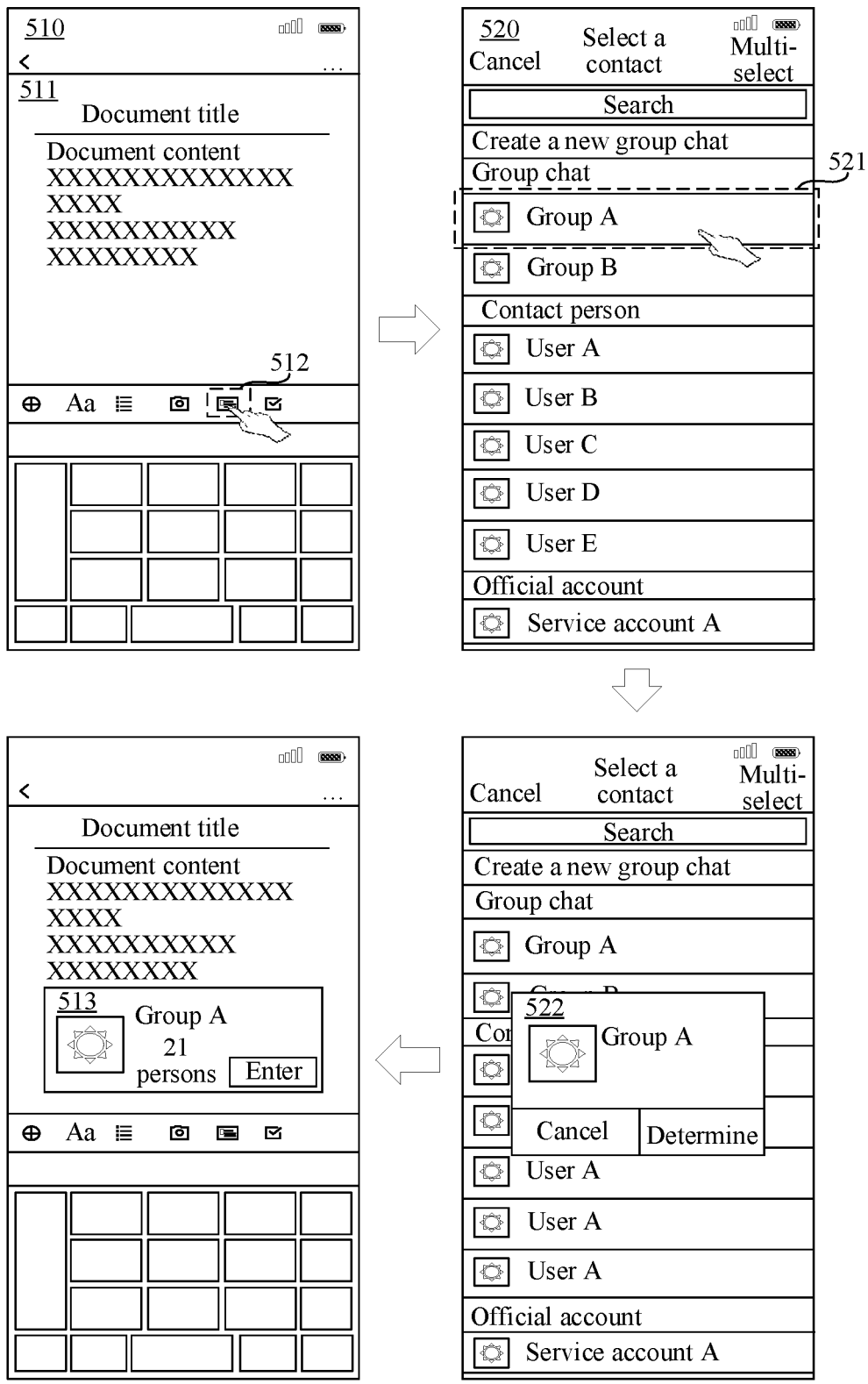
FIG. 5 is a schematic diagram of inserting a group contact provided by one exemplary embodiment of this application.

In one example, FIG. 5 shows a schematic diagram of inserting a group contact provided by one exemplary embodiment of this application. The editing interface 510 displays an online document 511. The editing interface 510 further displays a contact insertion control 512. A candidate account list 520 is displayed after a user clicks the contact insertion control 512. When an option corresponding to the first account 521 of the group account type in the candidate account list 520 receives a clicking operation, an insertion confirmation box 522 pops up. When the insertion confirmation box 522 receives a confirmation signal, a contact 513 corresponding to the first account 521 is input at a third display position in the online document 511. The contact 513 corresponding to the first account displays a group avatar, a group name, and a connection control.

In some embodiments, the group corresponding to the contact corresponding to the first account may be a group created by the user in a contact inserting process. For example, when the candidate account list is pulled through the contact insertion control, the candidate account list further includes a group creation control, and the user may select a certain quantity of third user accounts through the group creation control to create the group corresponding to the contact corresponding to the first account. In one example, when the second application is the enterprise-based social application, the user may also create a group by selecting accounts of a department and a team corresponding to the enterprise when inserts a contact.

When the account type of the contact corresponding to the first account is the public account type, the account information displayed in the contact corresponding to the first account may include account information such as a public account name, a public account promotional image, developer/merchant information corresponding to the public account, public account description information, public account ID, and preview information of recently released content.

Figure 6:
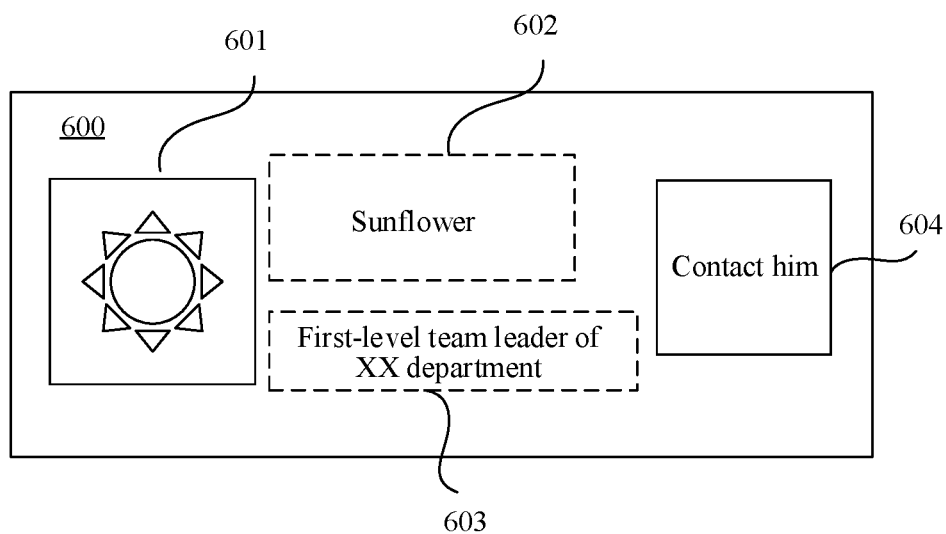
FIG. 6 is a schematic diagram of compositions of a contact corresponding to a first account provided by one exemplary embodiment of this application.

Schematically, the contact corresponding to the above first account is obtained by assembling a contact element for previewing the account information. The above contact element includes at least one of the elements such as a picture element, a text element, a voice element, and a control element. Each type of account information corresponds to one contact element. In one example, FIG. 6 shows a schematic diagram of compositions of a contact corresponding to a first account provided by one exemplary embodiment of this application. When the account information that can be indicated by a contact 600 corresponding to the first account includes a user avatar, a user nickname, and user description information, the contact 600 corresponding to the first account includes a picture element 601 used for previewing the user avatar, a text element A602 used for previewing the user nickname, a text element B603 used for previewing the user description information, and a contact control 604 used for providing a session service with the first account.

In some embodiments, when the above contact insertion operation indicates to insert contacts corresponding to at least two first accounts into an online document, the contact insertion operation also indicates an account arrangement sequence between at least two first accounts. Schematically, the account arrangement sequence corresponding to the at least two first accounts is determined based on the contact insertion operation, and the contacts corresponding to the at least two first accounts are respectively displayed at least two positions in the online document based on the account arrangement sequence. In one example, the account arrangement sequence between at least two first accounts in the online document is determined according to an account selection sequence when a user selects first accounts. That is, the account arrangement sequence between at least two first accounts is indicated according to the contact insertion operation, so that to-be-inserted contacts corresponding to the at least two first accounts are displayed at at least two positions according to the account arrangement sequence. Therefore, the displaying manners of the to-be-inserted contacts can be more organized, and the aesthetic degree of displaying the contact can be improved.

In some embodiments, the first accounts of different account types are displayed in different displaying manners. Schematically, the account type of the first account is determined based on the contact insertion operation. The account type includes at least one of a user account type, a group account type, or a public account type. In response to the account type of the first account being the user account type, the contact corresponding to the first account is displayed in a first displaying manner, and the first displaying manner is used for indicating to display user information corresponding to the first account in the contact corresponding to the first account. Or, in response to the account type of the first account being the group account type, the contact corresponding to the first account is displayed in a second displaying manner, and the second displaying manner is used for indicating to display group information corresponding to the first account in the contact corresponding to the first account. Or, in response to the account type of the first account being the public account type, the contact corresponding to the first account is displayed in a third displaying manner, and the third displaying manner is used for indicating to display service information corresponding to the first account in the contact corresponding to the first account. The first displaying manner, the second displaying manner, and the third displaying manner are different displaying manners. In some embodiments, the contact corresponding to the first account in the first displaying manner displays a user avatar element, a user nickname element, and a user description information element. The contact corresponding to the first account in the second displaying manner displays a group avatar element composed of group member avatars, a group nickname element, and a group description information element. The contact corresponding to the first account in the third displaying manner displays a public account avatar, a public account name, and preview content of an article recently released by a public account. That is, the to-be-inserted contact is displayed in different displaying manners according to the first account corresponding to different account types, and the display content in the to-be-inserted contacts displayed in different displaying manners is different, which can improve the diversity of contact content display.

In some embodiments, after the online document inserted with the contact corresponding to the first account is saved at the cloud, and when other terminals open the online document, a session service may be established with the first account through the contact corresponding to the first account in the online document. Schematically, based on a contact relationship between the first account and a second account, a session interface including the second account is displayed in response to receiving the contact triggering operation in the online document. The session interface is used for providing a session service with the first account for the second account, and the second account is an account for opening the online document. That is, the second account may establish the session service with the first account with a friend relationship through a contact triggering operation, which improves the diversity of session service establishment manners, and also improves the human-computer interaction efficiency.

In conclusion, according to an information insertion method provided by the embodiment of this application, in a document editing process, the contact corresponding to the first account is inserted, through the contact insertion operation, into the online document currently being edited, so that the contact corresponding to the first account is displayed in document content of the online document, and the contact corresponding to the first account is used for providing a communication portal for instant messaging with the first account, which not only improves the efficiency of disseminating the account information in the document, but also provides a new communication manner.

Schematically, when the second application is an enterprise-based social application, the efficiency of disseminating contacts of users in an enterprise can be improved in a manner of inserting the contact corresponding to the first account in the online document, so as to improve the collaboration efficiency between the users in the enterprise when disseminating information through the second application. When the first application is a secondary application of the second application, the contact corresponding to the first account is inserted into the online document to disseminate user information, which can further realize fusion of a document function and a social function, can improve the efficiency of disseminating document information, and can also improve the efficiency of disseminating user information in the social application.

Figure 7:
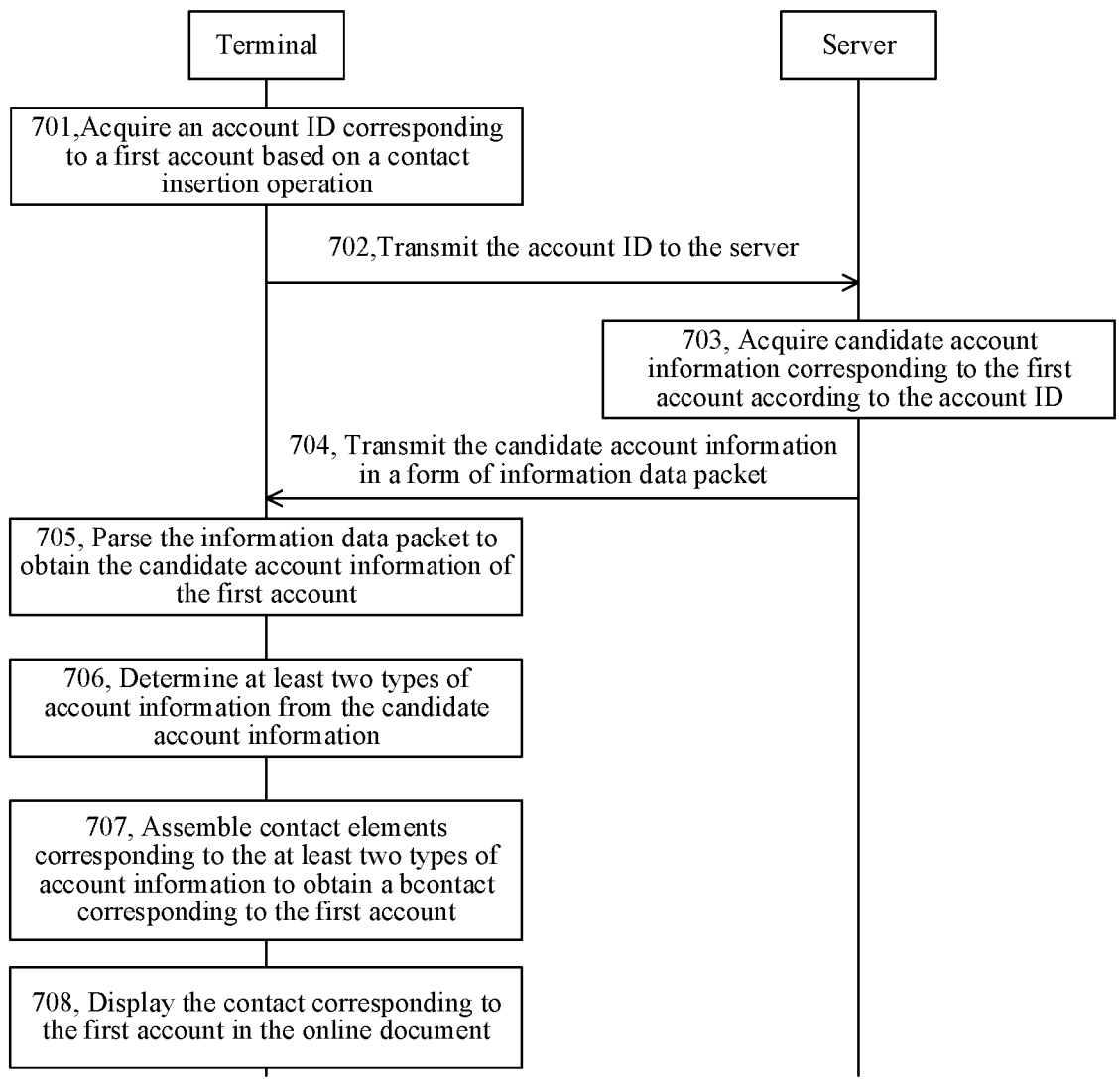
FIG. 7 is a flowchart of an information insertion method provided by another exemplary embodiment of this application.

Refer to FIG. 7, which shows an information insertion method provided by one exemplary embodiment of this application. In the embodiment of this application, a bottom implementation of a contact insertion process corresponding to a first account is schematically described. Steps 701 to 708 may be performed after receiving a contact insertion operation. The method includes:

Step 701: A terminal acquires an account ID corresponding to the first account based on the contact insertion operation.

The terminal needs to acquire candidate account information corresponding to the first account based on the contact insertion operation. In the embodiment of this application, the candidate account information of the first account is saved in a server.

Schematically, when the first application serving as the document application is a web application based on a hypertext markup language 5.0 (HTML5, H5), the second application is a client application, and the first application receives a contact addition operation in a tool bar of an editing interface, a front end H5 informs the client of the second application to open a candidate account list through an application programming interface (API). The contact addition operation is used for inserting at least one contact in the editing interface. The above API may be a JavaScript (JS) API. When a selection operation of the user for the first account is received, as a contact insertion operation, a confirmation box pops up in a display interface of the first application for the user to confirm. After a confirmation signal is received, the terminal extracts an account ID corresponding to the first account.

Schematically, when the first application serving as the document application is a secondary application embedded into the second application, and the editing interface of the first application is directly displayed through the second application, then data interaction may be directly performed through a module interface between a document functional module and a social functional module in the second application.

In some embodiments, the account type of the first account includes at least one of a user account type, a group account type, or a public account type.

Step 702: The terminal transmits the account ID to the server.

Schematically, the terminal requests account information corresponding to the first account from the server by transmitting the account ID corresponding to the first account to the server. In some embodiments, the terminal transmits an account information acquisition request to the server to indicate the server to issue the account information corresponding to the first account. The account information acquisition request carries the account ID corresponding to the first account.

Step 703: The server acquires candidate account information corresponding to the first account according to the account ID.

The server reads the candidate account information corresponding to the first account from a database according to the received account ID. In some embodiments, the server returns all account information corresponding to the first account to the terminal for the terminal to generate a contact corresponding to the first account, or the server screens from all account information according to a preset screening condition to obtain the candidate account information.

Schematically, in addition to the account information used for identifying an account, the candidate account information may further include access certificate information of the account, contact timeliness information, and a uniform resource locator (url) corresponding to information authentication code (for example, information such as two-dimensional code and three-dimensional code corresponding to the first account).

Step 704: The server transmits the candidate account information in the form of an information data packet.

In some embodiments, the server packs the candidate account information of the first account in the information data packet in a vCode form, and returns the information data packet to the terminal. In one example, taking the second application being an enterprise social application, and the account type of the first account being a user account type as an example, the vCode is shown as follows:

```
{
  Retcode: 0//0: Success 1: Fail, determine whether the data packet is returned successfully
  errMs: 'Xxx', //error information content displayed when the data packet fails to return
  iconurl, //string avatar
  name, //string nickname
  position, //string position
  gender, //int 1: male, 2: female, gender
  profile_code, //string access certificate
  qrcodeurl: 'https://', //string two-dimensional code url
  expire: '123', // uint32 expiration time
  type: 0, //0 represents the present enterprise, 1 represents upstream and downstream enterprises, and 2 represents a personal account
}
```

Figure 8:
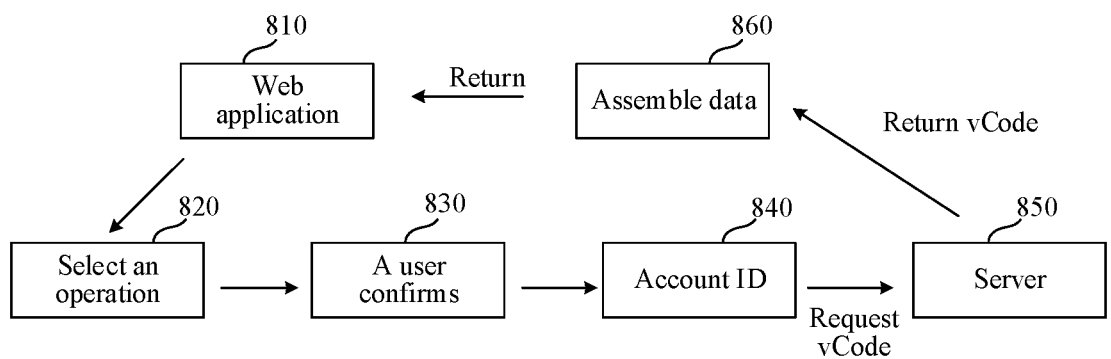
FIG. 8 is a flowchart of a candidate account information acquisition method provided by one exemplary embodiment of this application.

Schematically, refer to FIG. 8, which shows a flowchart of a candidate account information acquisition method provided by one exemplary embodiment of this application. As shown in FIG. 8, when a web application 810 running in a terminal receives a selection operation 820 of a user for the first account, a confirmation box pops up for the user to confirm 830. After receiving a confirmation signal, the terminal acquires an account ID 840 corresponding to the first account. After acquiring the account ID 840 corresponding to the first account, the terminal indicates a server 850 to issue the account information corresponding to the first account by transmitting an account information acquisition request to the server 850. The account information acquisition request is transmitted in a vCode form. When the server 850 receives the account information acquisition request transmitted by the terminal, the server 850 packs candidate account information of the first account in the information data packet in a vCode form, generates assembling data 860, and returns the assembling data 860 to the web application 810 for displaying.

Schematically, the account information of the first account that the server can provide for the terminal is the information authorized or licensed by a user of the first account, and the collection, use, and processing of relevant data need to comply with relevant laws, regulations, and standards of relevant countries and regions.

Step 705: The terminal parses the information data packet to obtain the candidate account information of the first account.

The terminal parses the received information data packet to obtain the candidate account information of the first account. In some embodiments, the parsed candidate account information is subjected to functional division. The account information used for identifying the account is used for front-end generation of the contact, and the data used for identifying account verification is used for back-end link generation of the contact.

Step 706: The terminal determines at least two types of account information from the candidate account information.

Schematically, the at least two types of account information are the account information used for generating front-end display content of the contact corresponding to the first account.

In some embodiments, the terminal determines the at least two types of account information from the candidate account information according to the account type of the first account. For example, when the account type is a user account type, a user avatar, a user nickname, and user description information are selected as the determined account information.

In some embodiments, the terminal determines the at least two types of account information according to the indication of a user. Schematically, the user may indicate which information of the first account needs to be displayed on the contact corresponding to the first account to be displayed after completing a selection process of the first account. In one example, when the user selects the first account, the terminal acquires the candidate account information corresponding to the first account, and displays the candidate account information that can generate a contact element. The user checks and confirms the account information that needs to be displayed.

Step 707: Assemble contact elements corresponding to the at least two types of account information to obtain a contact corresponding to the first account.

The terminal respectively generates corresponding contact elements according to the determined at least two types of account information. In some embodiments, the first application pre-stores contact element templates corresponding to different account information, retrieves a corresponding template according to the account information, and adds the account information to the template to obtain a contact element. For example, when the user information is a user avatar, the terminal reads the template corresponding to the user avatar, and integrates image data corresponding to the user avatar into the template to obtain a corresponding avatar contact element. The above avatar contact element is used for previewing an account avatar of the first account.

Step 708: The terminal displays the contact corresponding to the first account in an online document.

The terminal displays the contact corresponding to the first account at a display position of the online document. In some embodiments, the above display position may be a document location designated by the user, or a position in current document content where a cursor is located, or may also be a document position preset by a system, which is not limited herein.

In some specific embodiments, when the online document is an online document, the account information displayed by the contact corresponding to the first account may be updated along with an update of the account information of the first account. That is, when the account information of the first account in the second application changes, the server issues updated account information to the terminal that opens the online document, so that the terminal displays the contact corresponding to the updated first account. Schematically, in response to a presence of an update of the account information corresponding to the contact element, at least two types of updated account information are acquired from the server. The contact element is reassembled based on the at least two types of updated account information to obtain the contact corresponding to the updated first account. The contact corresponding to the first account is replaced with and displayed as the contact corresponding to the updated first account in the online document. That is, when the account information corresponding to the contact element is updated, the updated account information can be obtained from the server to assemble the contact element, which can prevent the user from inserting a to-be-inserted contact including an updated contact element into the online document again, improve the efficiency of inserting the contact, and also improve the human-computer interaction efficiency.

In one example, H5 triggers a JSAPI to prompt the terminal to request at least two types of updated account information from the server, and the terminal calls back the at least two types of updated account information to the H5 after acquiring the at least two types of updated account information. Taking the first account being the group account as an example, the at least two types of account information include group name information, group avatar information, and information indicating that whether the second account that logs in the current terminal is in the group. The content of the corresponding callback protocol is as follows:

```
{
  Name: "", //string group name
  Iconurl: "", //string group avatar
  inGroupChat: 0 //0 indicates being in the group, and 1 indicates not being in the group
}
```

Figure 9:
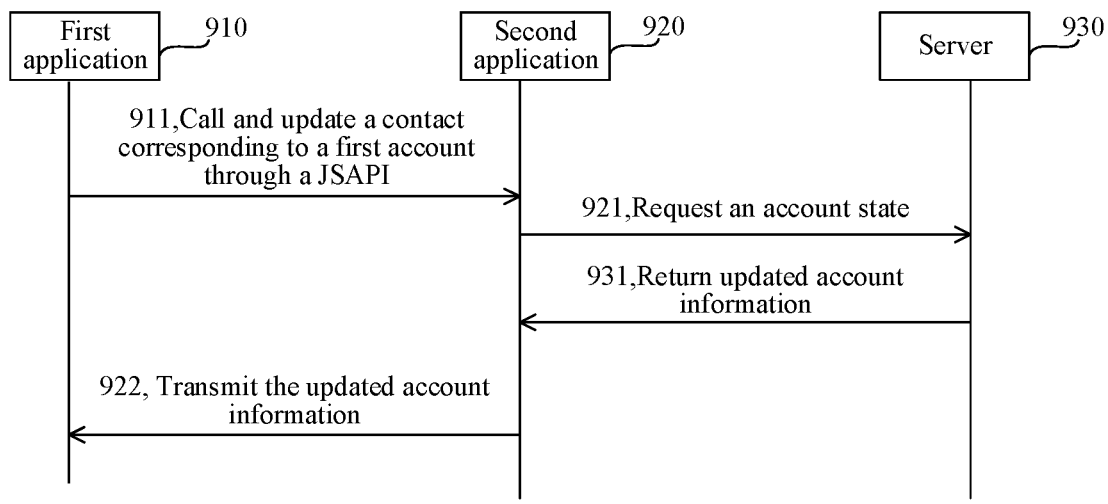
FIG. 9 is a contact updating timing diagram provided by one exemplary embodiment of this application.

Schematically, FIG. 9 shows a contact updating timing diagram provided by one exemplary embodiment of this application. A first application 910 updates a contact 911 corresponding to a first account by calling a JSAPI. A second application 920 requests an account state 921 from a server 930. The server 930 returns updated account information 931 to the second application 920. The second application 920 transmits updated account information 922 to the first application 910.

In conclusion, according to an information insertion method provided by the embodiment of this application, in a document editing process, the contact corresponding to the first account is inserted, through the contact insertion operation, into the online document currently being edited, so that the contact corresponding to the first account is displayed in document content of the online document, and the contact corresponding to the first account is used for providing a communication portal for instant messaging with the first account, which not only improves the efficiency of disseminating the account information in the document, but also provides a new communication manner.

Figure 10:
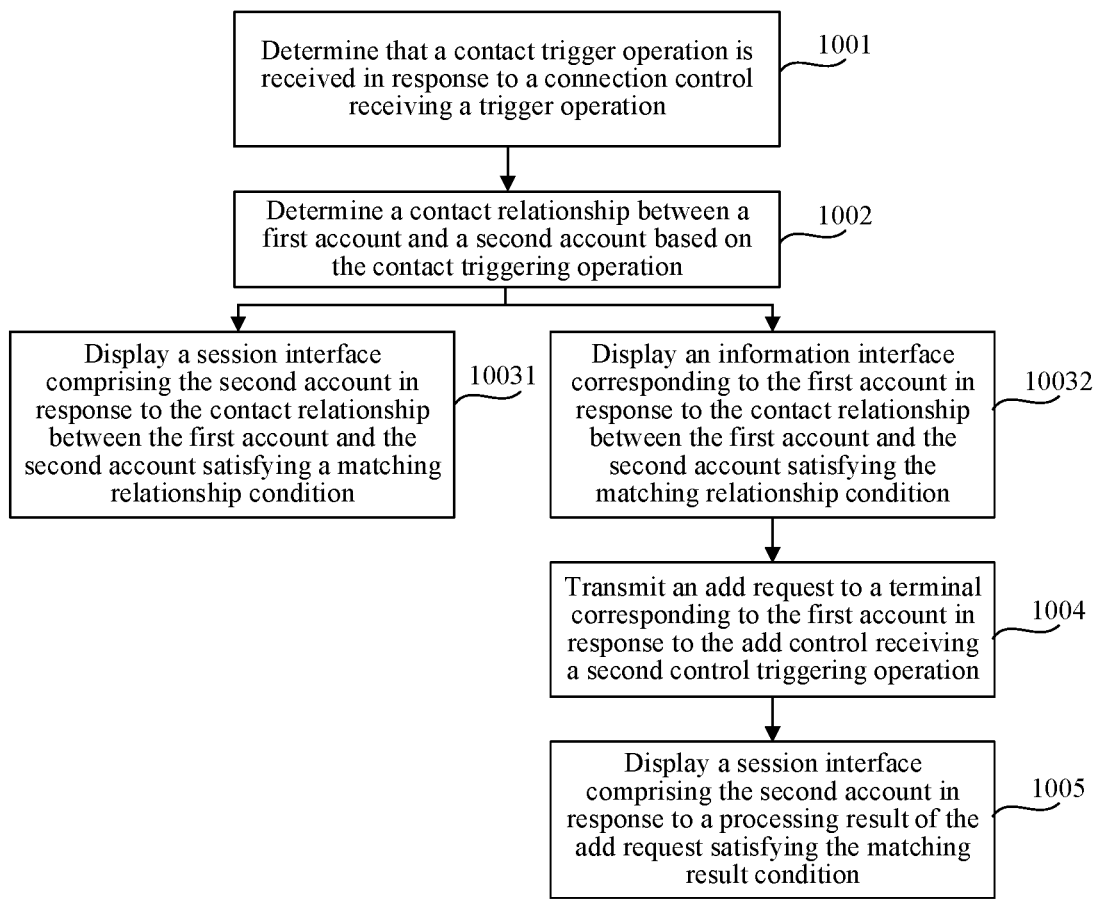
FIG. 10 is a flowchart of an information using method provided by one exemplary embodiment of this application.

Refer to FIG. 10, which shows an information using method provided by one exemplary embodiment of this application. In the embodiment of this application, a using process of a contact corresponding to a first account of an online document is schematically described. Steps 1001 to 1005 are applied after the contact corresponding to the first account is inserted into the online document. The method includes:

Step 1001: Determine that a contact triggering operation is received in response to a connection control receiving a triggering operation.

In the embodiment of this application, the connection control is displayed in the contact corresponding to the first account displayed in the online document. The connection control is used for providing instant messaging with the first account. The instant messaging is described by taking a session service as an example.

In some embodiments, the above connection control may be set by a user when the contact corresponding to the first account is inserted into the online document, that is, the user may customize whether the contact corresponding to the first account provides a session service function with the first account. If the contact corresponding to the first account provides a session service function with the first account, then the contact element displayed on the contact corresponding to the first account includes the above connection control.

An execution terminal in the embodiment of this application may be a terminal that edits the online document, or may also be other terminals that acquire the online terminal, which is not limited herein.

Figure 11:
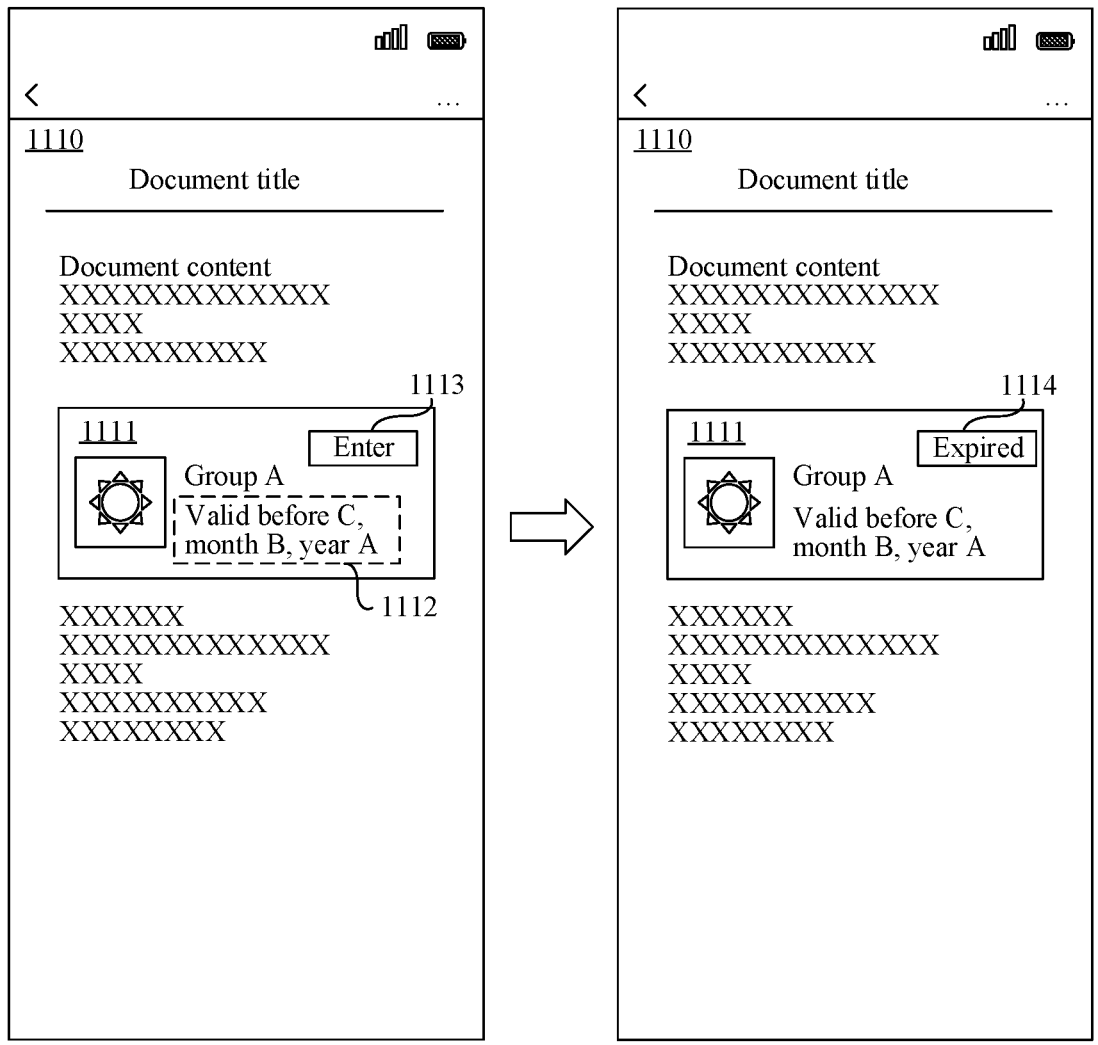
FIG. 11 is a schematic diagram of a time effect limitation provided by one exemplary embodiment of this application.

In some embodiments, the above connection control corresponds to a time effect limitation. The time effect limitation may be set by inserting the contact corresponding to the first account into the online document, or may also be preset by a system. A time validity period indicated by the time effect limitation is calculated from a moment when the contact corresponding to the first account is inserted into the online document. In one example, the time effect limitation corresponding to the contact corresponding to the first account indicates that a validity period after the contact corresponding to the first account is inserted into the online document, that is, if there is a terminal opens the online document within six months, a session service can be established with the first account through the contact corresponding to the first account in the online document. Schematically, FIG. 11 shows a schematic diagram of a time effect limitation provided by one exemplary embodiment of this application. Taking the account type of the first account being the group account as an example, when the terminal that a second account logs in opens an online document 1110, the online document 1110 displays a contact 1111 corresponding to the first account. The contact 1111 corresponding to the first account displays validity period information 1112. When the current moment does not reach invalid time corresponding to the contact corresponding to the first account, the contact 1111 corresponding to the first account displays a connection control 1113 in a valid state. When the current moment has exceeded valid time corresponding to the contact corresponding to the first account, the contact corresponding to the first account displays a connection control 1114 that is in an invalid state.

In one example, after the connection control displayed in a to-be-inserted contact receives a triggering operation, h5 will return vCode in the to-be-inserted contact to the terminal. A protocol corresponding to the vCode is as follows:

```
{
    'docid': 'xxx',
    'vCode': 'xxx',
}
```

Step 1102: Determine a contact relationship between the first account and the second account based on a contact triggering operation.

The above second account is an account that opens the online document. In the embodiment of this application, when a first application that provides a document function is a secondary application of a second application that provides a social function, the second account is an account that the first application logs in, and is also an account that the second application logs in.

Schematically, after the terminal determines that a contact triggering operation is received, whether a session service with the first account can be provided for the second account needs to be determined according to the contact relationship between the first account and the second account.

In some embodiments, when the first account is an account in a user account type, the contact relationship between the first account and the second account includes at least one of a friend relationship, a non-friend relationship, a blacklist relationship, a colleague relationship, and a same group relationship. The blacklist relationship is used for indicating that the second account is an account in a first account blacklist, and/or, the first account is an account in a second account blacklist. The colleague relationship is used for indicating accounts belonging to the same enterprise in an enterprise social application. The above colleague relationship may also be divided into a same enterprise relationship, a same part relationship, a same team relationship, and the like. The above same group relationship is used for indicating that both the first account and the second account are members in a certain group. The above group may be a designated group or may also be any one of groups to which the first account and the second account belong.

In some embodiments, when the first account is an account in a group account type, the contact relationship between the first account and the second account includes a group member relationship and a non-member relationship. The group member relationship is used for indicating that the second account is a member in a group corresponding to the first account. The non-member relationship is used for indicating that the second account does not in the group corresponding to the above first account.

In some embodiments, when the first account is an account in a public account type, the contact relationship between the first account and the second account includes a follow relationship, a non-follow relationship, a creator relationship, and the like. The follow relationship is used for indicating that the second account has followed the first account. The non-follow relationship is used for indicating that the second account does not follow the first account. The creator relationship is used for indicating that the second account is an account that has the operations of managing, editing, and article publishing on the first account.

Step 10031: Display a session interface including the second account in response to the contact relationship between the first account and the second account satisfying a matching relationship condition.

Schematically, the matching relationship condition is used for determining a matching condition between a relationship type of the contact relationship between the first account and the second account and the session service. In some embodiments, the above matching relationship condition may be preset by a system, or may also be customized and set by a user when the contact corresponding to the first account is inserted into the online document.

In some embodiments, the matching relationship condition corresponds to the account type of the first account. Schematically, when the first account is an account in the user account type, in one example, the matching relationship condition may indicate that the matching relationship condition is satisfied when the contact relationship between the first account and the second account is a friend relationship, that is, the session service is provided for the first account and the second account only when the first account and the second account are in the friend relationship. In another example, the above matching relationship condition may also indicate to determine that the contact relationship satisfies the matching relationship condition only when the first account and the second account is the colleague relationship, which is only schematically described herein, and does not limit the matching relationship condition.

When the first account is an account in a group account type, the matching relationship condition may indicate to determine that the matching relationship condition is satisfied when the contact relationship between the first account and the second account is the group member relationship, that is, when the second account is a member in a group corresponding to the first account.

When the first account is an account in a public account type, the matching relationship condition may indicate to determine that the matching relationship condition is satisfied when the contact relationship between the first account and the second account is the follow relationship, that is, when the second account is a fan account of the first account.

In the embodiment of this application, after the contact relationship between the first account and the second account satisfies the matching relationship condition, a session interface including the second account may be displayed. When the first account is an account in the user account type, the corresponding session interface is a session interface including the first account and the second account. When the first account is an account in the group account type, the corresponding session interface is a group session interface corresponding to the first account. When the first account is an account in the public account type, the corresponding session interface is a private message session interface corresponding to the first account.

Figure 12:
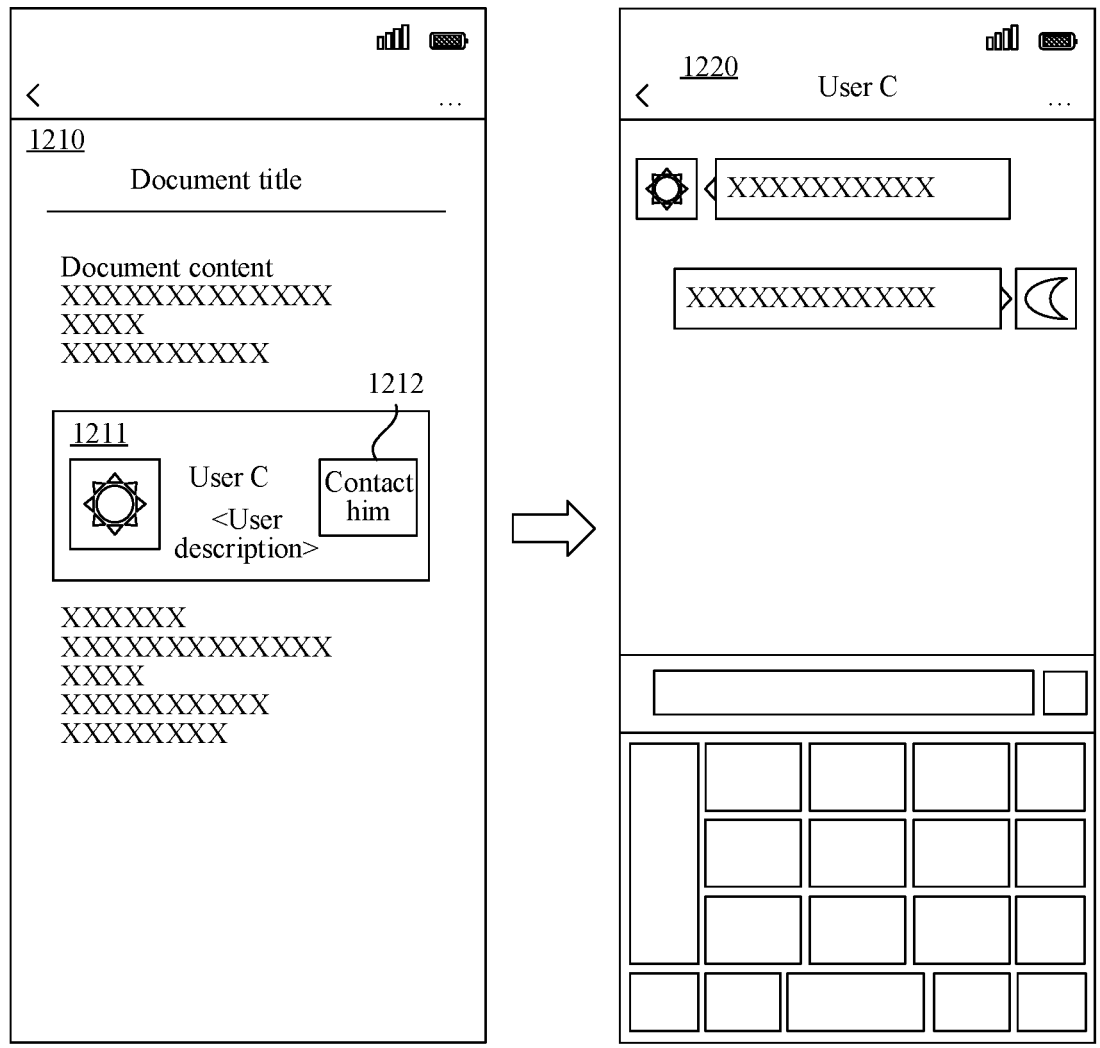
FIG. 12 is a schematic diagram of session establishment provided by one exemplary embodiment of this application.

In one example, FIG. 12 shows a schematic diagram of session establishment provided by one exemplary embodiment of this application. Taking the first account being an account in the user account type as an example, an online document 1210 displayed by a first application includes a contact 1211 corresponding to the first account. The contact 1211 corresponding to the first account includes a connection control 1212. When the connection control 1212 receives a triggering operation, the contact relationship between the first account and the second account is determined. When the first account and the second account are friends with each other, a session interface 1220 between the first account and the second account is displayed.

Step 10032: Display an information interface corresponding to the first account in response to the contact relationship between the first account and the second account satisfying the matching relationship condition.

When the contact relationship between the first account and the second account does not satisfy the matching relationship condition, the information interface corresponding to the first account is skipped correspondingly. The information interface includes an add control. The add control is configured to establish the contact relationship between the first account and the second account to match the matching relationship condition. For example, the matching relationship condition indicates that the first account and the second account need to be in a friend relationship, and the add control can provide a friend adding function. In another example, the matching relationship condition indicates that the first account and the second account need to be in a group member relationship, and the add control can provide a group adding function. In another example, the matching relationship condition indicates that the first account and the second account need to be in a follow relationship, and the add control provides a public account following function.

Step 1004: Transmit an add request to a terminal corresponding to the first account in response to the add control receiving a second control triggering operation.

In the embodiment of this application, after the add control of the information interface corresponding to the first account receives a triggering operation, the terminal transmits a connection establishment request to a server based on an account ID of the first account. After the server receives the above connection establishment request, the add request is transmitted to the terminal that the first account logs in according to the account ID.

Schematically, when the first account is an account in the user account type, the add request is transmitted to a user terminal corresponding to the first account, and is processed by a user corresponding to the first account. When the first account is an account in the group account type, the add request is transmitted to a terminal corresponding to a creator account and/or an administrator account in a group corresponding to the first account, and is processed by a creator and/or an administrator of the group. When the first account is a public account type, if the first account is set to be capable of being followed by anyone, then the add request is transmitted to the server. The server automatically processes, and the server transmits a processing result to terminals corresponding to the first account and the second account. If the first account is set to be capable of being followed only after reviewing, then the add request is transmitted to the terminal of an administration account corresponding to the first account, and is processed by the terminal of the above administration account.

Step 1005: Display a session interface including the second account in response to a processing result of the add request satisfying the matching result condition.

The matching result condition is used for determining a matching condition between the processing result and the matching relationship condition.

Schematically, the terminal that the first account logs in displays the add request after receiving the add request. The add request is processed by a user to obtain the processing result. The above terminal returns the processing result to a server. The server updates the contact relationship between the first account and the second account according to the processing result, and returns the processing result to the terminal corresponding to the second account.

In some embodiments, when the processing result indicates that the first account agrees on the contact relationship requested to be established by the second account, it is determined that the processing result satisfies the matching result condition. When the processing result indicates that the second account refuses the contact relationship requested to be established by the second account, it is determined that the processing result does not satisfy the matching result condition.

Schematically, a session interface is displayed when it is determined that the processing result satisfies the matching relationship condition. When the first account is an account in the user account type, the corresponding session interface is the session interface including the first account and the second account. When the first account is an account in the group account type, the corresponding session interface is a group session interface corresponding to the first account. When the first account is an account in the public account type, the corresponding session interface is a private message session interface corresponding to the first account.

Figure 13:
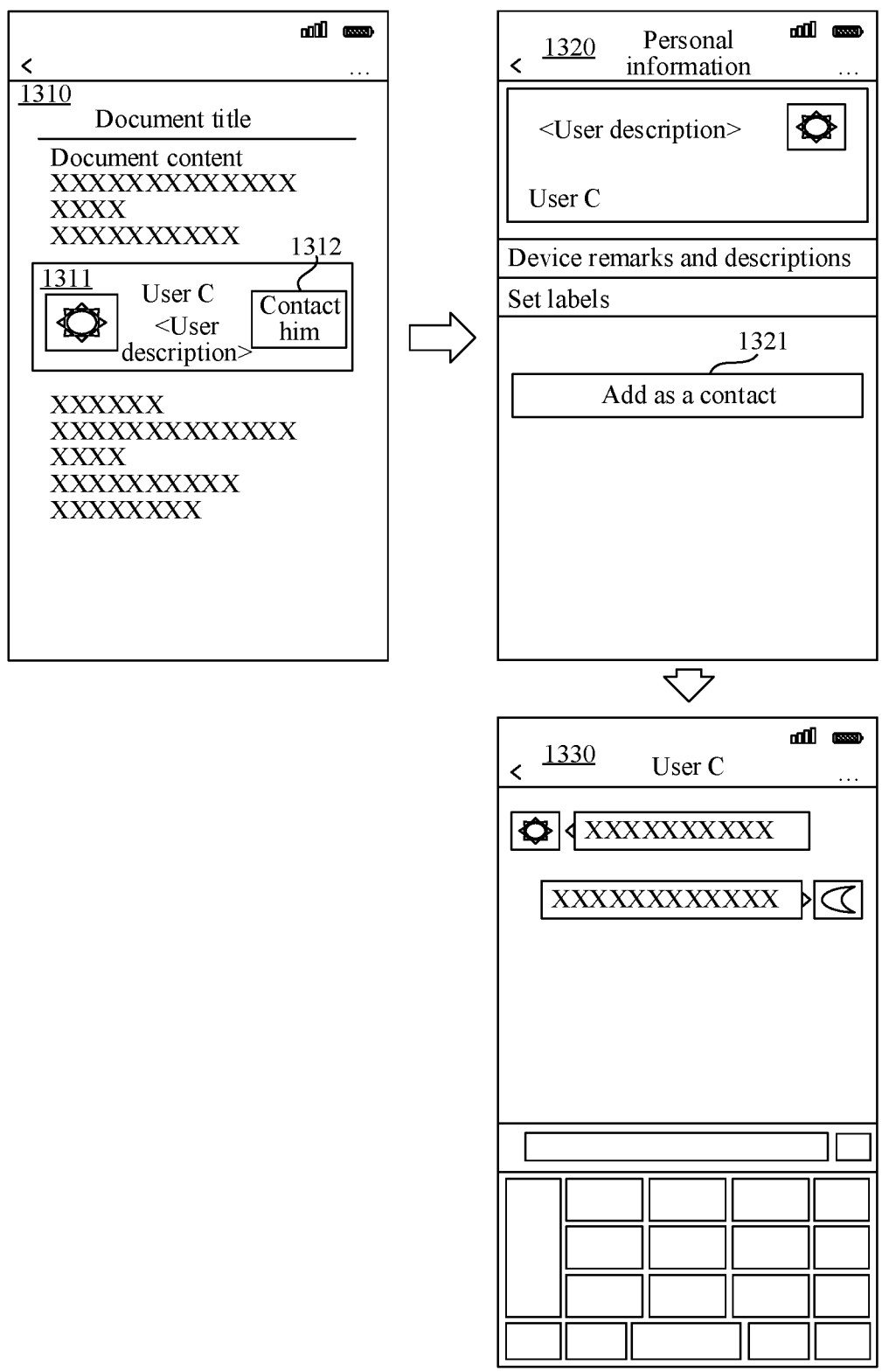
FIG. 13 is a schematic diagram of session establishment provided by another exemplary embodiment of this application.

In one example, FIG. 13 shows a schematic diagram of session establishment provided by one exemplary embodiment of this application. Taking the first account being an account in the user account type as an example, an online document 1310 displayed by a first application includes a contact 1311 corresponding to the first account. The contact 1311 corresponding to the first account includes a connection control 1312. When the connection control 1312 receives a triggering operation, the contact relationship between the first account and the second account is determined. When the first account and the second account are in a non-friend relationship, an information interface 1320 corresponding to the first account is skipped. The information interface 1320 includes an add control 1321. When the add control 1321 receives a triggering operation, a current terminal transmits an add request to a terminal corresponding to the first account through a server. After a user corresponding to the first account passes through the add request, then the session interface 1330 of the first account and the second account is displayed.

Figure 14:
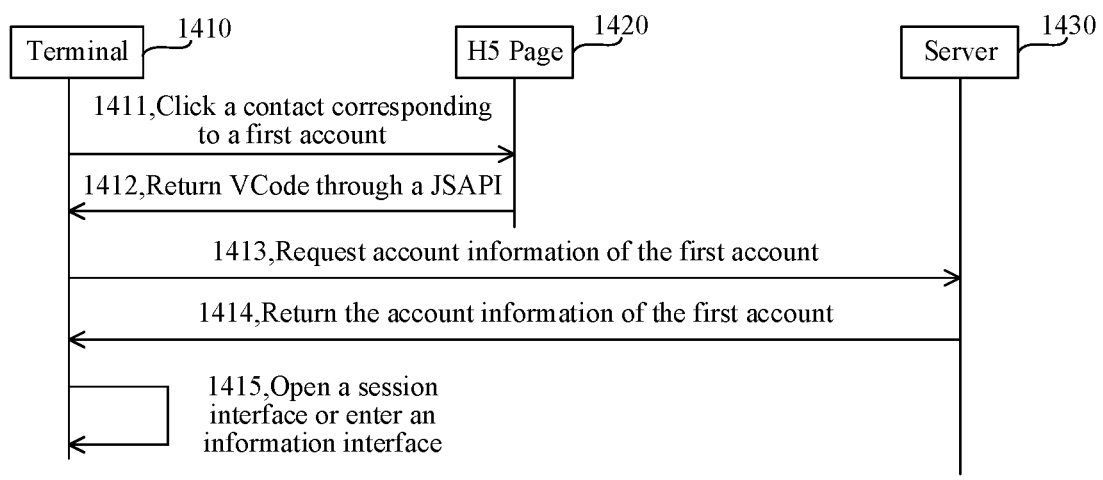
FIG. 14 is a timing diagram of a session service establishment process provided by one exemplary embodiment of this application.

Schematically, refer to FIG. 14, which shows a timing diagram of a session service establishment process provided by one exemplary embodiment of this application. A user clicks a contact 1411 corresponding to the first account through a terminal 1410. An H5 page 1420 corresponding to an online document returns vCode 1412 through a JSAPI. The terminal 1410 requests account information 1413 of the first account from a server 1430 through the vCode. The server 1430 returns account information 1414 of the first account to the terminal 1410. The terminal 1410 determines a relation chain between the first account and the second account, and opens a session interface or enters the information interface 1415.

In conclusion, according to the information using method provided by the embodiment of this application, the second account of the online document is opened, so that the session service may be established with the first account by inserting the contact corresponding to the first account into the online document. The above first account is an accounted indicated by the contact corresponding to the first account, that is, the user may quickly establish a session service with the account corresponding to the contact through the contact in the online document, which further improves the efficiency of disseminating the contact in the online document.

Figure 15:
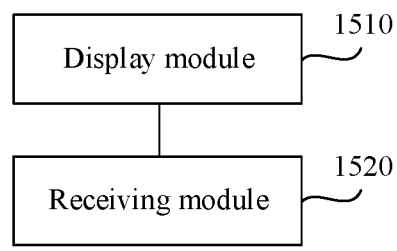
FIG. 15 is a structural block diagram of an information insertion apparatus provided by one exemplary embodiment of this application.

Refer to FIG. 15, which is a structural block diagram of an information insertion apparatus provided by one exemplary embodiment of this application. The apparatus includes the following modules:

a display module 1510, configured to display an editing interface corresponding to an online document, the editing interface being configured to edit document content of the online document;

a receiving module 1520, configured to receive a contact insertion operation in the editing interface, the contact insertion operation being used for inserting a contact corresponding to a first account into the online document; and the display module 1510 being further configured to display the contact corresponding to the first account in the online document based on the contact insertion operation, the contact corresponding to the first account being used for providing a communication portal for instant messaging with the first account.

Figure 16:
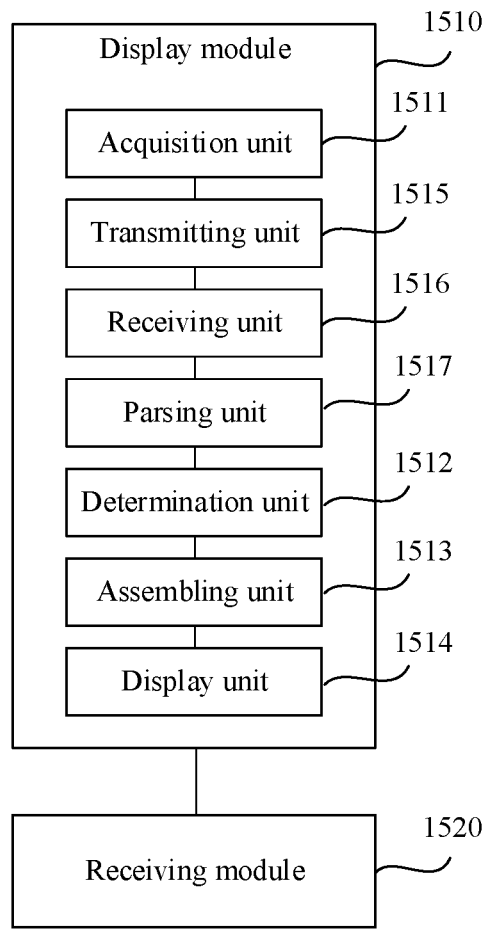
FIG. 16 is a structural block diagram of an information insertion apparatus provided by another exemplary embodiment of this application.

In some embodiments, referring to FIG. 16, the display module 1510 further includes:

an acquisition unit 1511, configured to acquire candidate account information corresponding to the first account based on the contact insertion operation;

a determination unit 1512, configured to determine at least two types of account information from the candidate account information;

an assembling unit 1513, configured to assemble contact elements corresponding to the at least two types of account information to obtain a contact corresponding to the first account; and a display unit 1514, configured to display the contact corresponding to the first account in the online document.

In some embodiments, the acquisition unit 1511 is further configured to acquire an account ID corresponding to the first account based on the contact insertion operation.

The display module 1510 further includes:

a transmitting unit 1515, configured to transmit the account ID to a server, the server being configured to acquire the candidate account information corresponding to the first account according to the account ID;

a receiving unit 1516, configured to receive an information data packet returned by the server, the information data packet being used for transmitting the candidate account information; and a parsing unit 1517, configured to parse the information data packet to obtain the candidate account information of the first account.

In some embodiments, the acquisition unit 1511 is further configured to acquire at least two types of updated account information from the server in response to a presence of an update of the account information corresponding to the contact elements;

the assembling unit 1513 is further configured to reassemble the contact elements based on the at least two types of updated account information to obtain a contact corresponding to the updated first account; and the display unit 1514 is further configured to replace and display the contact corresponding to the first account in the online document as the contact corresponding to the updated first account.

In some embodiments, the determination unit 1512 is further configured to determine an account type of the first account based on the contact insertion operation, the account type includes at least one of a user account type, a group account type, or a public account type; and the display unit 1514 is further configured to display the contact corresponding to the first account in a first displaying manner in response to the account type of the first account being the user account type, the first displaying manner being used for indicating that user information corresponding to the first account is displayed in the contact corresponding to the first account; or, display a contact corresponding to the first account in a second displaying manner in response to the account type of the first account being the group account type, the second displaying manner being used for indicating that group information corresponding to the first account is displayed in the contact corresponding to the first account; or, display the contact corresponding to the first account in a third displaying manner in response to the account type of the first account being the public account type, the third displaying manner being used for indicating that service information corresponding to the first account is displayed in the contact corresponding to the first account.

In some embodiments, the editing interface includes a contact insertion control used for providing a contact insertion function;

the receiving module 1520 is further configured to receive a first control triggering operation for the contact insertion control;

the display module 1510 is further configured to display a candidate account list based on the first control triggering operation, the candidate account list including the first account; and the receiving module 1520 is further configured to determine that the contact insertion operation is received in response to receiving a selection operation for the first account in the candidate account list.

In some embodiments, the display module 1510 is further configured to display, based on a contact relationship between the first account and a second account, a session interface including the second account in response to receiving the contact triggering operation in the online document, the session interface being used for providing a session service with the first account for the second account, and the second account being an account for opening the online document.

In some embodiments, the contact corresponding to the first account includes a connection control;

the receiving unit 1516 is further configured to determine that the contact triggering operation is received in response to the connection control receiving a triggering operation;

the determination unit 1512 is further configured to determine the contact relationship between the first account and the second account based on the contact triggering operation; and the display unit 1514 is further configured to display the session interface including the second account in response to the contact relationship between the first account and the second account satisfying a matching relationship condition, the matching relationship condition being used for determining a matching condition between a relationship type of the contact relationship between the first account and the second account and the session service.

In some embodiments, the display unit 1514 is further configured to display an information interface corresponding to the first account in response to a failure of matching the contact relationship between the first account and the second account with the matching relationship condition, the information interface including an add control;

the receiving unit 1516 is further configured to transmit an add request to a terminal corresponding to the first account in response to the add control receiving a second control triggering operation; and the display unit 1514 is further configured to display the session interface including the second account in response to a processing result of the add request satisfying a matching result condition, the matching result condition being used for determining a matching condition between the processing result and the matching relationship condition.

In some embodiments, when the quantity of the first accounts is at least two, the determination unit 1512 is further configured to determine an account arrangement sequence corresponding to the at least two first accounts based on the contact insertion operation; and the display unit 1514 is further configured to respectively display contacts corresponding to the at least two first accounts at at least two positions in the online document based on the account arrangement sequence.

In conclusion, according to an information insertion apparatus provided by the embodiment of this application, in a document editing process, the contact corresponding to the first account is inserted, through the contact insertion operation, into the online document currently being edited, so that the contact corresponding to the first account is displayed in document content of the online document, and the contact corresponding to the first account is used for providing a communication portal for instant messaging with the first account, which not only improves the efficiency of disseminating the account information in the document, but also provides a new communication manner.

The information insertion apparatus provided by the above embodiments is described with an example of division of the above functional modules. In a practical application, the above functions may be allocated to be completed by different function modules according to requirements, that is, the internal structure of a device is divided into different functional modules, so as to complete all or part of the functions described above. In addition, the information insertion apparatus provided by the above embodiments and the information insertion method provided by the above embodiments belong to the same concept. For a specific implementation process, refer to the method embodiments. Details are not further described herein. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 17:
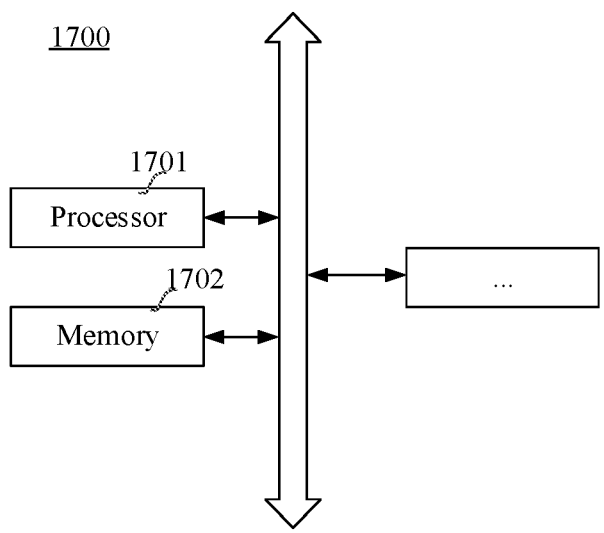
FIG. 17 is a structural block diagram of a terminal provided by another exemplary embodiment of this application.

FIG. 17 shows a structural block diagram of a terminal 1700 provided by one exemplary embodiment of this application. The terminal 1700 may be: a smartphone, a tablet computer, an MP3 player, an MP4 player, a notebook computer, or a desktop computer. The terminal 1700 may also be referred to as another name such as user equipment, a portable terminal, a laptop terminal, or a desktop terminal.

Generally, the terminal 1700 includes: a processor 1701 and a memory 1702.

The processor 1701 may include one or more processing cores, for example, a 4-core processor or an 8-core processor. The processor 1701 may be implemented in at least one hardware form of a digital signal processor (DSP), a field-programmable gate array (FPGA), and a programmable logic array (PLA). The processor 1701 may also include a main processor and a coprocessor. The main processor is a processor configured to process data in wake-up state, and is also referred to as a central processing unit (CPU). The coprocessor is a low power consumption processor configured to process the data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be non-transient. The memory 1702 may further include a high-speed random access memory and a nonvolatile memory, for example, one or more disk storage devices or flash storage devices. In some embodiments, the non-transitory computer-readable storage medium in the memory 1702 is configured to store at least one instruction, and the at least one instruction is configured to be executed by the processor 1701 to implement the information insertion method provided by the method embodiments of this application.

Schematically, the terminal 1700 further includes other components. A person skilled in the art may understand that the structure shown in FIG. 17 does not constitute a limitation on the terminal 1700, and may include more or fewer components than those shown in the figure, or some components may be combined, or a different component deployment may be used.

A person of ordinary skill in the art may understand that all or some of the steps of various methods in the above embodiments may be implemented by a program instructing relevant hardware. The program may be stored in a computer-readable storage medium. The computer-readable storage medium may be the computer-readable storage medium included in the memory in the above embodiments, or may be a computer-readable storage medium that exists independently and that is not assembled in a terminal. The computer-readable storage medium stores at least one instruction, at least one program, a code set or an instruction set. The at least one instruction, the at least one program, the code set, or the instruction set is loaded or executed by the processor to implement the information insertion method according to any of the above method embodiments.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the above embodiments of this application are only for description and do not represent the advantages or disadvantages of the embodiments.

What is claimed is:

1. An information insertion method performed by a computer device, the method comprising:

displaying an editing interface corresponding to an online document associated with a second account of a social networking application;

receiving a contact insertion operation in the editing interface;

in response to the contact insertion operation, inserting a contact corresponding to a first account of the social networking application into the online document;

displaying the contact corresponding to the first account in the online document, the contact corresponding to the first account providing a communication portal for instant messaging with the first account through the online document; and in response to receiving a triggering operation on the contact in the online document by the second account:

displaying an instant messaging session interface between the first account and the second account when there is a preset contact relationship between the first account and the second account in the social networking application; and displaying an information interface corresponding to the first account when there is no contact relationship between the first account and the second account, the information interface including an add contact control for inviting the first account to be a contact of the second account.

2. The method according to claim 1, wherein the displaying the contact corresponding to the first account in the online document comprises:

acquiring candidate account information corresponding to the first account;

determining at least two types of account information from the candidate account information;

assembling contact elements corresponding to the at least two types of account information to obtain a contact corresponding to the first account; and displaying the contact corresponding to the first account in the online document.

3. The method according to claim 1, wherein the inserting a contact corresponding to a first account into the online document comprises:

acquiring an account identifier (ID) corresponding to the first account based on the contact insertion operation;

transmitting the account ID to a server, the server being configured to acquire account information corresponding to the first account according to the account ID;

receiving an information data packet returned by the server, the information data packet being used for transmitting the account information; and parsing the information data packet to obtain an account corresponding to the first account.

4. The method according to claim 3, further comprising:

acquiring at least two types of updated account information from the server in response to a presence of an update of the account information corresponding to the first account;

reassembling contact information based on the at least two types of updated account information to obtain a contact corresponding to the updated first account; and replacing and displaying the contact corresponding to the first account in the online document as the contact corresponding to the updated first account.

5. The method according to claim 1, wherein the displaying the contact corresponding to the first account in the online document comprises:

determining an account type of the first account, the
account type comprising at least one of a user account
type, a group account type, or a public account type;
and
displaying the contact corresponding to the first account
in a displaying manner according to the account type of
the first account.

6. The method according to claim 1, wherein the editing interface comprises a contact insertion control used for providing a contact insertion function;
the receiving a contact insertion operation in the editing interface comprises:
receiving a first control triggering operation for the contact insertion control;
displaying a candidate account list based on the first control triggering operation, the candidate account list comprising the first account; and
determining that the contact insertion operation is received in response to receiving a selection operation for the first account in the candidate account list.

7. The method according to claim 1, wherein, when a quantity of the first accounts is at least two, the displaying the contact corresponding to the first account in the online document comprises:
determining an account arrangement sequence corresponding to the at least two first accounts based on the contact insertion operation; and
respectively displaying contacts corresponding to the at least two first accounts at at least two positions in the online document based on the account arrangement sequence.

8. A computer device, comprising a processor and a memory, the memory storing at least one program, and the at least one program being loaded and executed by the processor and causing the computer device to implement an information insertion method including:
displaying an editing interface corresponding to an online document associated with a second account of a social networking application;
receiving a contact insertion operation in the editing interface;
in response to the contact insertion operation, inserting a contact corresponding to a first account of the social networking application into the online document;
displaying the contact corresponding to the first account in the online document, the contact corresponding to the first account providing a communication portal for instant messaging with the first account through the online document; and
in response to receiving a triggering operation on the contact in the online document by the second account:
displaying an instant messaging session interface between the first account and the second account when there is a preset contact relationship between the first account and the second account in the social networking application; and
displaying an information interface corresponding to the first account when there is no contact relationship between the first account and the second account, the information interface including an add contact control for inviting the first account to be a contact of the second account.

9. The computer device according to claim 8, wherein the displaying the contact corresponding to the first account in the online document comprises:
acquiring candidate account information corresponding to the first account;
determining at least two types of account information from the candidate account information;
assembling contact elements corresponding to the at least two types of account information to obtain a contact corresponding to the first account; and
displaying the contact corresponding to the first account in the online document.

10. The computer device according to claim 8, wherein the inserting a contact corresponding to a first account into the online document comprises:
acquiring an account identifier (ID) corresponding to the first account based on the contact insertion operation;
transmitting the account ID to a server, the server being configured to acquire account information corresponding to the first account according to the account ID;
receiving an information data packet returned by the server, the information data packet being used for transmitting the account information; and
parsing the information data packet to obtain an account corresponding to the first account.

11. The computer device according to claim 10, wherein the method further comprises:
acquiring at least two types of updated account information from the server in response to a presence of an update of the account information corresponding to the first account;
reassembling contact information based on the at least two types of updated account information to obtain a contact corresponding to the updated first account; and
replacing and displaying the contact corresponding to the first account in the online document as the contact corresponding to the updated first account.

12. The computer device according to claim 8, wherein the displaying the contact corresponding to the first account in the online document comprises:
determining an account type of the first account, the account type comprising at least one of a user account type, a group account type, or a public account type; and
displaying the contact corresponding to the first account in a displaying manner according to the account type of the first account.

13. The computer device according to claim 8, wherein the editing interface comprises a contact insertion control used for providing a contact insertion function;
the receiving a contact insertion operation in the editing interface comprises:
receiving a first control triggering operation for the contact insertion control;
displaying a candidate account list based on the first control triggering operation, the candidate account list comprising the first account; and
determining that the contact insertion operation is received in response to receiving a selection operation for the first account in the candidate account list.

14. The computer device according to claim 8, wherein, when a quantity of the first accounts is at least two, the displaying the contact corresponding to the first account in the online document comprises:
determining an account arrangement sequence corresponding to the at least two first accounts based on the contact insertion operation; and
respectively displaying contacts corresponding to the at least two first accounts at at least two positions in the online document based on the account arrangement sequence.

15. A non-transitory computer-readable storage medium, storing at least one program, the program being loaded and executed by a processor of a computer device and causing the computer device to implement an information insertion method including:
- displaying an editing interface corresponding to an online document associated with a second account of a social networking application;
- receiving a contact insertion operation in the editing interface;
- in response to the contact insertion operation, inserting a contact corresponding to a first account of the social networking application into the online document;
- displaying the contact corresponding to the first account in the online document, the contact corresponding to the first account providing a communication portal for instant messaging with the first account through the online document; and
- in response to receiving a triggering operation on the contact in the online document by the second account:
  - displaying an instant messaging session interface between the first account and the second account when there is a preset contact relationship between the first account and the second account in the social networking application; and
  - displaying an information interface corresponding to the first account when there is no contact relationship between the first account and the second account, the information interface including an add contact control for inviting the first account to be a contact of the second account.

16. The non-transitory computer-readable storage medium according to claim 15, wherein the displaying the contact corresponding to the first account in the online document comprises:
- acquiring candidate account information corresponding to the first account;
- determining at least two types of account information from the candidate account information;
- assembling contact elements corresponding to the at least two types of account information to obtain a contact corresponding to the first account; and
- displaying the contact corresponding to the first account in the online document.

17. The non-transitory computer-readable storage medium according to claim 15, wherein the inserting a contact corresponding to a first account into the online document comprises:
- acquiring an account identifier (ID) corresponding to the first account based on the contact insertion operation;
- transmitting the account ID to a server, the server being configured to acquire account information corresponding to the first account according to the account ID;
- receiving an information data packet returned by the server, the information data packet being used for transmitting the account information; and
- parsing the information data packet to obtain the account corresponding to the first account.

* * * * *